United States Patent [19]

Heuschen et al.

[11] Patent Number: 4,504,623
[45] Date of Patent: Mar. 12, 1985

[54] PROCESS OF PREPARING A POLYMER MIXTURE COMPRISING POLYVINYL CHLORIDE, A POLYCARBONATE AND A RUBBER LIKE POLYMER

[75] Inventors: Jean M. H. Heuschen, Halsteren; Jan Bussink, Bergen op Zoom; Willem L. Sederel, Roosendaal, all of Netherlands

[73] Assignee: General Electric Company, Mt. Vernon, Ind.

[21] Appl. No.: 559,767

[22] Filed: Dec. 9, 1983

[30] Foreign Application Priority Data

Feb. 14, 1983 [NL] Netherlands ........................ 8300538

[51] Int. Cl.$^3$ .............................................. C08L 69/00
[52] U.S. Cl. ....................................... 525/67; 525/71; 525/92; 525/146; 525/902
[58] Field of Search ................... 525/67, 71, 902, 146, 525/148, 92, 468

[56] References Cited

U.S. PATENT DOCUMENTS

| | | | |
|---|---|---|---|
| 3,882,192 | 5/1975 | Elghani et al. | 525/67 |
| 3,991,009 | 11/1976 | Margotte et al. | 525/67 |
| 4,105,711 | 8/1978 | Hardt et al. | 525/67 |

FOREIGN PATENT DOCUMENTS 2304894  8/1974  Fed. Rep. of Germany ........ 525/67

*Primary Examiner*—Theodore E. Pertilla
*Attorney, Agent, or Firm*—Martin B. Barancik

[57] ABSTRACT

A method of preparing a polymer mixture comprising polyvinyl chloride, an aromatic polycarbonate and a rubber like polymeric, characterized in that first a premixture comprising 60–90% by weight of aromatic polycarbonate and 10–40% by weight of rubber like polymer is prepared by mixing at a temperature above about 220° C., after which the resulting premixture is cooled to a temperature below about 220° C. and is mixed with the polyvinyl chloride.

7 Claims, No Drawings

PROCESS OF PREPARING A POLYMER MIXTURE COMPRISING POLYVINYL CHLORIDE, A POLYCARBONATE AND A RUBBER LIKE POLYMER

BACKGROUND OF THE INVENTION

Polymer mixtures comprising polyvinyl chloride, an aromatic polycarbonate and a rubber like polymer are known from German Patent Application No. 23 04 894 and German Patent Specification No. 24 02 176. German Patent Application No. 23 04 894 describes polymer mixtures comprising polyvinyl chloride, an aromatic polycarbonate preferably having a molecular weight from 20,000 to 60,000 and an ABS graft copolymer, a styrene maleic acid anhydride copolymer or an ethylene vinyl acetate copolymer. These known polymer mixtures, in as far as they comprise a rubber like polymer, are always prepared by first softening the polyvinyl chloride together with the ABS graft copolymer or the ethylene vinyl acetate copolymer after which plasticized polycarbonate is added.

The disadvantage of this method is that the polyvinyl chloride comes in contact with a plasticized polycarbonate mass having a temperature of approximately 250° C. At this temperature, thermal decomposition of polyvinyl chloride occurs and in the case of short contact times and the use of polyvinyl chloride stabilizers. German Patent Specification No. 24 02 176 describes polymer mixtures on the basis of polyvinyl chloride and a polycarbonate which may comprise a rubber or a rubber modified thermoplastic polymerisate. According to this prior art, polycarbonates having a weight averaged molecular weight from 20,000 to 80,000 are preferably used. As a rubber modified thermoplastic polymerizate are preferably used rubbers on the basis of polybutadiene or butadiene copolymerizates.

These known polymer mixtures can be prepared by dissolving the polymeric constituents in suitable solvents and evaporation or coprecipitation. According to this prior art it is also possible to mix the constituents mechanically. According to this German Patent Specification the rubber in the polymer mixtures forms a natural phase which is finely divided in the polymer mixture.

The invention provides a method of preparing polymer mixtures comprising polyvinyl chloride, an aromatic polycarbonate and a rubber like polymer, in which thermal decomposition of the polyvinyl chloride is prevented.

DESCRIPTION OF THE INVENTION

The method according to the invention is characterized in that first a premixture comprising of 60–90% by weight of aromatic polycarbonate and 10–40% by weight of rubber like polymer is prepared by mixing at a temperature above about 220° C., after which the resulting premixture is cooled to a temperature below about 220° C. and is mixed with the polyvinyl chloride.

It has been found that, by mixing the polycarbonate in a plastic condition at a temperature above about 220° C., preferably about 240°–260° C., with the rubber like polymer, a premixture can be obtained which, at temperatures below about 220° C., preferably about 190°–210° C., is sufficiently plastic for readily mixing it with the polyvinyl chloride without thermal decomposition of the polyvinyl chloride occurring.

In order to completely exclude or virtually completely exclude thermal decomposition of the polyvinyl chloride it is to be preferred to mix the polyvinyl chloride with usual thermal stabilizers and lubricants before mixing it with the premixture.

Very good results are obtained in the method according to the invention when an aromatic polycarbonate is used having a comparatively low molecular weight, preferably a weight averaged molecular weight from 10,000 to 20,000

Homopolymers, copolymers including graft copolymers and block copolymers or mixtures thereof may be used as a rubber like polymer in the method according to the invention. These rubber like polymers may consist of several phases, for example, a core of a first phase around which one or several phases are provided as a shell. Of importance is only that the rubber like polymer comprises at least one rubber like phase, that is to say, a phase built up from a polymer or copolymer having a glass transition temperature of less than 10° C., preferably of less than −10° C. Such rubber like polymers are generally known from patent literature or are commercially available. The rubber like polymer usually comprises 40–100% of a rubber like phase. The core may predominantly consist of a $C_{3-8}$ alkylacrylate rubber or predominantly of a polybutadiene rubber. One or more different monomers are grafted on the main chain. Suitable monomers include styrene, α-methyl styrene, acrylonitrile, methacrylic acid esters, acrylic acid esters or mixtures thereof, the ester portion being formed from alkyl of three to eight carbon atoms, acrylic acid or methacrylic acid.

The preferably used rubber like polymer comprises a first rubber like phase from predominantly alkyl acrylate alkyl of from three to eight carbon atoms around which one or more shells have been provided by graft polymerization. The main chain may be cross-linked with a cross-linking agent (for example, with a diacrylate such as butylene diacrylate). One or more different monomers are grafted on the main chain. Suitable monomers are styrene, α-methyl styrene, acrylonitrile, methacrylic acid esters, acrylic acid esters or mixtures thereof, the ester portion being formed from alkyl of one to eight carbon atoms.

As rubber like polymers are preferbly used graft copolymers consisting of a rubber-like core, corresponding to the above-mentioned main chain, and one or more shells provided therearound in one or more steps by a graft reaction on the core, c.q. the first shell.

The polymer mixtures which are prepared by means of the method according to the invention generally comprise 5–90% by weight of polyvinyl chloride, 10–95% by weight of aromatic polycarbonate to which 10–40% by weight calculated with respect to the polycarbonate of the rubber like polymer has been added.

Polyvinyl chloride (PVC) is to be understood to include in this specification all polymers and copolymers which are built up for at least 70 mole % from units derived from vinyl chloride monomer. The vinyl chloride may be copolymerized with, for example, vinylidene chloride, vinylidene fluoride, vinyl esters such as vinyl acetate, (meth)acrylic acid (esters), amides and nitrile compounds of (meth) acrylic acid, maleic acid esters and semi-esters, respectively, maleinimide, vinyl ether and olefinic unsaturated hydrocarbons, such as ethylene, propylene.

A PVC having a K-value (according to Fikentscher, measured in a 1% cyclohexanone solution of 23° C.) of 50–75 is preferably used. The PVC may be prepared by emulsion polymerization or suspension—or mass polymerization.

Polyvinyl chlorides which are mixed with stabilizers are preferably used in the method according to the invention. As stabilizers may be used the additives which are conventional for PVC, for example, stabilizers on the basis of lead, barium/cadmium, calcium/zinc and organic tin compounds.

Aromatic polycarbonate is to be understood to mean homopolycarbonates, copolycarbonates and mixtures of various homopolycarbonates and copolycarbonates which comprise units derived from one or several aromatic compounds having at least two hydroxy groups. Particularly suitable are those polycarbonates which comprise units of bis (hydroxyphenyl) alkanes for example, 2,2-bis(4-hydroxyphenyl)propane or polycarbonates the aromatic nucleus of which is substituted with one or more halogen atoms.

In addition to the above-mentioned constituents the polymer mixtures according to the invention may comprise any further additives usual for PVC and PC; pigments and dyes, additives to obtain flame retarding properties, additives to improve the impact strength, additives to further improve the processability, for example, lubricants and fillers, may be mentioned by name.

The method according to the invention is carried out as follows: the polycarbonate is made plastic by heating and is mixed with 10–40% by weight of rubber like polymer. Temperatures of approximately 220°–260° C. are required to plasticize the polycarbonate. When the molecular weight of the polycarbonate is low, a lower temperature is sufficient than when the molecular weight is higher. Heating and mixing may be carried out in an extruder. By mixing with the rubber like polymer, a premixture is obtained which, at temperatures below about 220° C., is sufficiently soft for being readily mixed with the PVC.

The resulting premixture is now cooled to below about 220° C. In the plastic condition (for which temperatures of approximately 190°–220° C. are required), the premixture is mixed with plasticized polyvinyl chloride for example in an extruder. The plasticized polyvinyl chloride is preferably premixed with usual stabilizers and lubricants. The resulting polymer mixture may further be processed, for example, to grains or pellets, in the usual manner.

In the polymer mixture according to the invention the rubber-like polymer is dispersed in one or more PVC-PC phases which are present in the polymer mixture in a mutually finely divided state. The invention will be described with reference to the following examples.

EXAMPLE I

A polycarbonate rubber premixture was prepared by mixing, in a single blade extruder at 250° C., 80 parts by weight of an aromatic polycarbonate with 20 parts by weight of KM 323 B of Rohm and Haas Co. (a graft copolymer built up from approximately 65% of polybutylacrylate with grafted thereon approximately 35% of methylmethacrylate). The polycarbonate was the homopolymer derived from 2,2-bis(4-hydroxyphenyl) propane and phosgene having a weight averaged molecular weight of 18,000. 55 parts by weight of polyvinyl chloride (having a K-value according to Fikentscher of 66) were softened at 200° C. while adding 0.8 parts by weight of an organic tin compound (Harochem T 201 from Haagen Chemie B.V.) and 0.3 parts by weight of a usual lubricant (AC-316A from Allied Chemical Company). The softened PVC was then mixed at 200° C. with 45 parts by weight of the polycarbonate rubber premixture; the resulting polymer mixture was then processed on an injection molding machine to standardized test pieces for determining the mechanical properties. The mechanical properties of the test pieces were determined. The results obtained are recorded in Table A below.

EXAMPLE II*

For comparison, a polymer mixture was prepared from the same constituents and in the same quantities as indicated in Example I. The aromatic polycarbonate was not premixed with the rubber-like polymer; all polymeric constituents were simultaneously mixed with each other mechanically in the softened condition. In order to obtain a good mixing, a minimum processing temperature of 225° C. was required. The mechanical properties of test samples manufactured from the polymer mixtures thus obtained are also recorded in Table A.

EXAMPLE III*

A polymer mixture was prepared in a substantially identical manner as indicated in Example II*. The only difference with Example II* consisted in that the polymeric constituents were mixed at 240° C. The mechanical properties of test samples manufactured from the polymer mixture thus obtained are also recorded in Table A.

TABLE A

| Property | Testing method | Unit | Example I | II* | III* |
|---|---|---|---|---|---|
| Tensile strength at yield point | ASTM D638 | N/mm$^2$ | 53 | 52 | 53 |
| Tensile strength at rupture | ASTM D638 | N/mm$^2$ | 42 | 41 | 42 |
| Elongation at yield point | ASTM D638 | % | 7 | 7 | 7 |
| Elongation at rupture | ASTM D638 | % | 48 | 33 | 26 |
| Bending strength | ASTM D790 | N/mm$^2$ | 95 | 90 | 93 |
| Bending modulus | ASTM D790 | N/mm$^2$ | 2350 | 2250 | 2200 |
| Unnotched impact strength according to Izod at room temperature | ASTM D256 | J/m | no rupture | no rupture | no rupture |
| Notch impact strength according to Izod at room temperature | ASTM D256 | J/m | 446 | 209 | 53 |
| Unnotched impact strength according to Charpy at room temperature | DIN 53453 | kJ/m$^2$ | no rupture | no rupture | no rupture |

TABLE A-continued

| Property | Testing method | Unit | Example I | Example II* | Example III* |
|---|---|---|---|---|---|
| Notch impact strength according to Charpy at room temperature | DIN 53453 | kJ/m² | 39 | 12 | 8 |
| Heat resistance (1.82 MPa) | ASTM D648 | (°C.) | 90 | 85 | 81 |
| Vicat VST/B | DIN 53460 | (°C.) | 110 | 109 | 106 |

*For comparison

What is claimed is:

1. A method of preparing a polymer mixture comprising polyvinyl chloride, an aromatic polycarbonate and a rubber like polymeric, characterized in that first a premixture comprising 60-90% by weight of aromatic polycarbonate and 10-40% by weight of rubber like polymer is prepared by mixing at a temperature above about 220° C., after which the resulting premixture is cooled to a temperature below about 220° C. and is mixed with the polyvinyl chloride.

2. A method as claimed in claim 1, characterized in that the aromatic polycarbonate is mixed with the rubber like polymer at about 240°-260° C. and the resulting premixture is mixed with the polyvinyl chloride at about 190°-210° C.

3. A method as claimed in claim 1, characterized in that a polymer mixture is prepared, the aromatic polycarbonate component of which consists for more than 90% by weight of an aromatic polycarbonate having a weight averaged molecular weight from 10,000 to 20,000.

4. A method as claimed in claim 1, characterized in that the aromatic polycarbonate is mixed with a rubber like polymer in the form of a graft copolymer built up from a first rubber like phase on which a second non-rubber-like phase is grafted.

5. A method as claimed in claim 4, characterized in that the aromatic polycarbonate is mixed with a graft copolymer consisting of a rubber like core around which one or more shells have been provided by graft polymerization.

6. A method as claimed in claim 4, characterized in that the rubber like phase comprises alkylacrylate units.

7. A method as claimed in claim 5, characterized in that the rubber like phase comprises alkylacrylate units.

* * * * *